Oct. 23, 1956 S. D. MILLER 2,767,869
LOADER FOR ATTACHMENT TO A LIFT-MECHANISM OF A TRACTOR
Filed June 14, 1954 2 Sheets-Sheet 1

United States Patent Office 2,767,869
Patented Oct. 23, 1956

2,767,869

LOADER FOR ATTACHMENT TO A LIFT-MECHANISM OF A TRACTOR

Sidney D. Miller, Minety, England, assignor to A. B. Blanch and Company Limited, Crudwell, near Malmesbury, England Application June 14, 1954, Serial No. 436,566

3 Claims. (Cl. 214—141)

The invention relates to a loader for attachment to a tractor lift-mechanism of the kind including a pair of rearwardly-directed hydraulically-actuated lifting arms and an attachment point centrally above them. The object of the invention is a loader (for example, for farmyard manure or trusses of hay) which, when lowered, can be backed up to the load and then operated to raise the latter, with less effort than hitherto, to a discharge point—for example, a truck to be loaded.

According to the invention the loader includes a pair of telescopically-related frames of which one has its forward end connected to the lifting arms to be lifted bodily thereby and the other frame carries at its rear a support for a load, and both frames and the attachment point are interconnected by a link mechanism such that, during upward tilting of the rear of both frames due to the operation of the lifting arms, the link mechanism is acted upon by its interconnection with the attachment point for moving the said other frame from a telescopically-retracted position to a telescopically-extended position whereby the load support is simultaneously elevated and moved rearwardly of the tractor. Thus, it will be seen that at the commencement of a loading operation (i. e., when the frames are at their lowest position) the said other frame is in its retracted position so that the moment of the load is a minimum, and that as the frames are up-tilted at the back and simultaneously extended the moment of the load need not be materially increased as the load is elevated to the discharge point.

According to a further feature the interconnection between the link mechanism and the attachment point includes a lost-motion means enabling both frames to be partially lifted before the telescopic-extension movement of the said other frame commences to take place. In this way, and if the load is, say, part of a heap of farmyard manure, the load can be raised a small distance without increasing its moment, and the tractor driven a short distance for separating it from the main heap before raising and extending the frames for delivering it to the discharge point.

According to yet another feature the link mechanism is arranged so as to be moved into an overset position against a stop when the frames are fully raised and extended whereby to relieve the loading applied to the overload spring which is normally associated with the attachment point and is intended to actuate a by-pass valve in the hydraulic circuit in over-load conditions.

Figure 1:
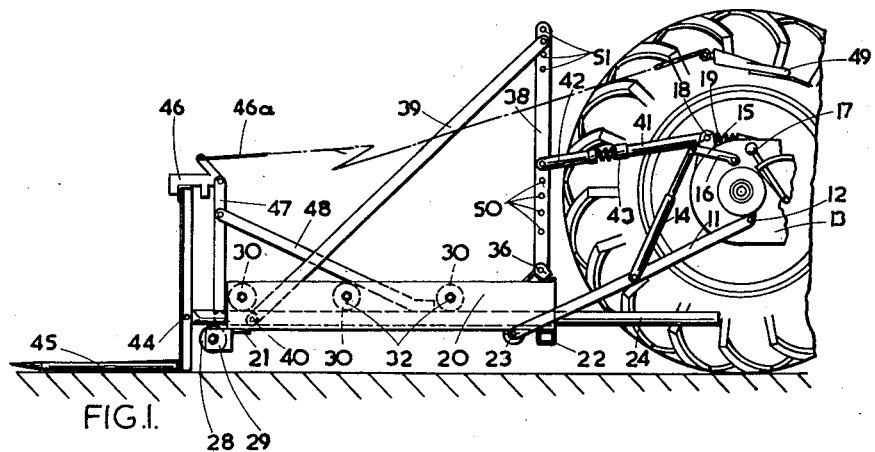
Figures 1 and 2 are respectively a side elevation and a plan of one form of loader according to the invention connected to the lift-mechanism of a tractor.
Figure 2:
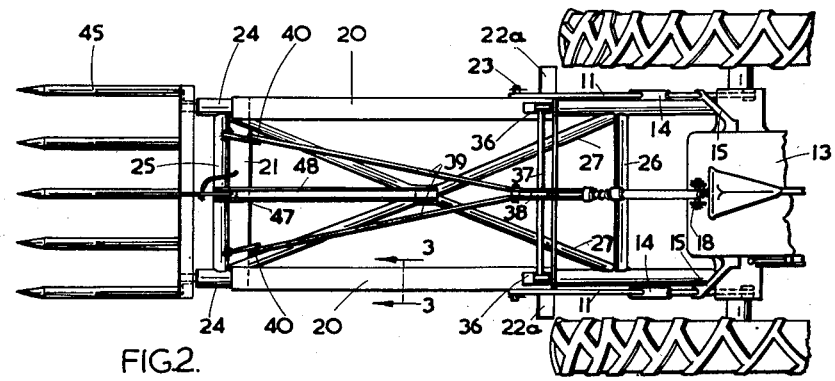
Figure 3:
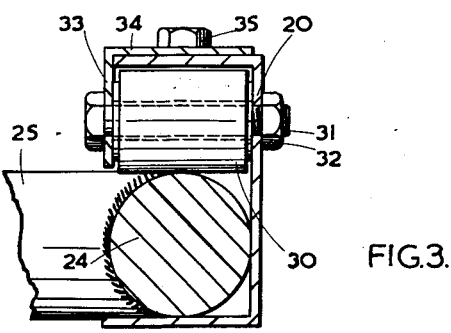
Figure 3 is a section, to a greatly enlarged scale, on the line 3—3 of Figure 2.

Referring to Figures 1 to 3, the lifting arms of the tractor are shown at 11, 11, being pivotally-supported at 12, from a casing portion 13 of the tractor, and interconnected by links 14, 14 to arms 15, 15 which are turned about their pivot axes 16, 16 when a hydraulic motor (not shown, and not forming part of the invention) is set in motion by actuating a control lever 17.

The attachment point is shown at 18 and is associated with an over-load spring 19 which is flexed, when the lifting mechanism is supporting an excessive load, to operate a relief valve (not shown) in the hydraulic circuit.

The loader includes inner and outer frames, the latter consisting of two facing channel members 20, 20 which are interconnected on the underside at their rear ends by a transverse angle-sectioned member 21, and at their front ends by a transverse member 22. The members 20, 20 have brackets 23 in which are journalled the rear ends of the lifting arms 11, 11, and the latter are engaged by extending ends 22a, 22a of the member 22 (i. e., due to the moment of the loader about the axes of the pivots 23, 23) for supporting the loader against downward turning about the said pivots.

The inner frame includes side members 24, 24 which are interconnected at their ends by transverse members 25, 26, and stayed by diagonal members 27, 27. The members 24 engage in the facing channels of the members 20, 20, resting on a roller 28 journalled in brackets 29 fast with the members 20, 20 and engaging under rollers 30, 30 which are journalled in the channels as shown by Figure 3. In the latter, one of the rollers 30 is shown journalled on a plain portion of a bolt 31, provided with a nut 32, which extends through the vertical wall of the channel 20 and a flange 33 of an angle-member whose other flange 34 is secured to the top of the channel 20 by bolts 35 (only one of which can be seen). By providing a series of rollers 30, as shown, the inner frame can be adequately supported in all its positions relatively to the outer frame.

At the top of the forward ends of the channels 20 are bearings 36, 36 for the ends of a shaft 37 having an up-standing central arm 38, and the unsupported end of this arm is connected by a two-fold link 39 to pivots 40 on brackets fast with the rearward transverse member 25 of the inner frame. Intermediate its ends the arm 38 is connected to the attachment point 18 by a strut 41, 42 which is telescopically-compressible against the effort of a spring 43.

Pivoted at 44 to the rearward end the inner frame is a known form of L-shaped, fork-like loading device 45 which is prevented from turning about the pivot 44 by a known trigger mechanism 46 pivotally-supported from the head of a stanchion 47. This stanchion is stayed at 48 from the inner frame, and the trigger mechanism is connected by a line 46a to the saddle 49 of the tractor whereby the driver can trip the loading device.

Figure 4:
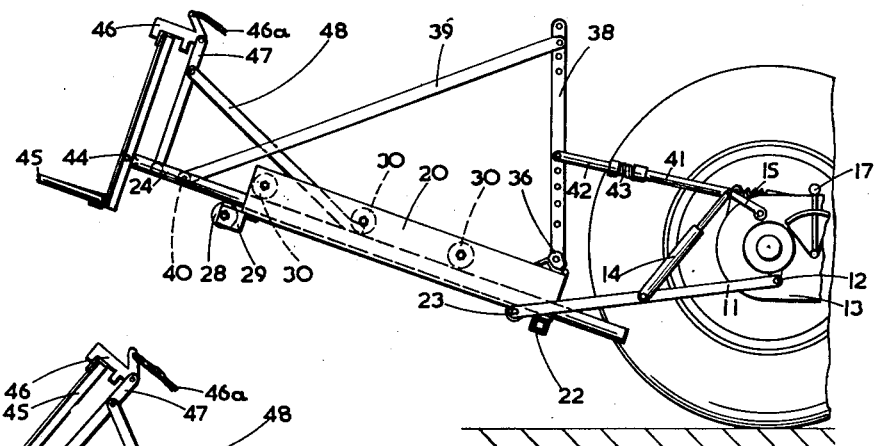
Figures 4 and 5 are views which are similar to Figure 1 but show the loader in two different positions of operation.
Figure 5:
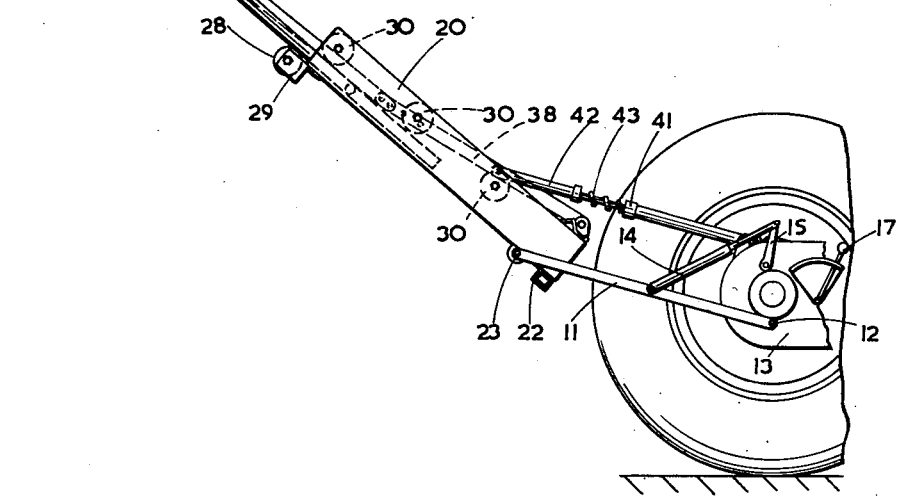

With the loader in the condition shown by Figure 1, the tractor is backed for the fork of the device 45 to engage under the load, and upon appropriately operating the lever 17 the lifting arms 11 tilt the rear ends of both frames upwardly to lift the load a short distance. As the inner frame is in its fully retracted position, in which its front extends under the tractor, the lifting moment is a minimum. After the load has been lifted sufficiently for the link 39 to act on the arm 38 for compressing the spring 43 to such an extent that the two parts 41 and 42 of the strut can no longer be telescoped, the strut moves the arm 38 reversely about its pivot 36 to cause the link 39 to act on the inner frame so as to extend it telescopically towards the rear as shown in Figure 4. Continued upward movement of the lifting arms extends the inner frame fully as shown by Figure 5, and in this position the arm 38 and strut 39 move into an over-set position against the transverse member 26 which, due to the telescopic extension, has moved to the appropriate position. In those conditions the spring 19 is relieved of stress and the by-pass will not be operated.

The load can then be discharged, and upon actuating the control lever 17 for lowering the lifting arms, the strut, which is fully extended, at first holds the arm 38 until the frames have been lowered sufficiently for the arm 38 and link to become unover-set, and continued lowering results in the parts resuming the positions shown in Figure 1.

Preferably, and as shown, the arm 38 is provided with two series of holes 50, 51 to provide alternative points of attachment respectively for the strut 42 and the link 39.

What I claim as my invention and desire to secure by Letters Patent of the United States is:

1. A loader, for attachment to a tractor lift-mechanism which comprises a pair of rearwardly-directed hydraulically-actuated lifting arms and an attachment point centrally above them, including a first rearwardly-extending frame which is connected at its forward end to the lifting arms so as to be lifted bodily thereby, a second rearwardly-extending frame carrying at its rear a support for a load, said second frame slidably supported from said first frame in alignment therewith, a first link pivoted at one end to said first frame in a position adjacent the front of the latter, a second link pivoted at one end to said second frame in a position adjacent the rear of the latter, a pivotal interconnection between the other ends of said links, and a strut interconnecting said first link and said attachment point, said strut comprising relatively telescoping parts and resiliently-extensible means biasing them in the separating direction, such that, during an initial raising of the frames from a lowered position by the operation of the lifting arms, both frames are partially raised without relative sliding movement until said links have acted on the said parts of said strut to telescope them together until said resiliently-extensible means has been compressed to solid condition, and such that during a continuation of the raising movement said strut reacts on said first link which in turn acts on said second link to slide said second frame relatively to said first frame from a telescopically-retracted position to a telescopically-extended position whereby the load support is simultaneously further elevated and moved rearwardly of the tractor.

2. A loader, for attachment to a tractor lift-mechanism which comprises a pair of rearwardly-directed hydraulically-actuated lifting arms and an attachment point centrally above them, including a first rearwardly-extending frame which is connected at its forward end to the lifting arms so as to be lifted bodily thereby, said first frame including side members with inwardly facing channels, a second rearwardly-extending frame carrying at its rear a support for a load, said second frame including side members engaged in the channels of said first frame, rollers journalled in said channels and slidably supporting said second frame from said first frame in alignment therewith, a first link pivoted at one end to said first frame in a position adjacent the front of the latter, a second link pivoted at one end to said second frame in a position adjacent the rear of the latter, a pivotal interconnection between the other ends of said links, and a strut interconnecting said first link and said attachment point, said strut comprising relatively telescoping parts and resiliently-extensible means biasing them in the separating direction, such that, during an initial raising of the frames from a lowered position by the operation of the lifting arms, both frames are partially raised without relative sliding movement until said links have acted on the said parts of said strut to telescope them together until said resiliently-extensible means has been compressed to solid condition, and such that during a continuation of the raising movement said strut reacts on said first link which in turn acts on said second link to slide said second frame on said rollers relatively to said first frame from a telescopically-retracted position to a telescopically-extended position whereby the load support is simultaneously further elevated and moved rearwardly of the tractor.

3. A loader, according to claim 2, in which said first and second links move to an over-set position about their pivotal interconnection to bear on a part of said first frame when said second frame is fully extended.

References Cited in the file of this patent

UNITED STATES PATENTS

| | | |
|---|---|---|
| 1,426,961 | Cope | Aug. 22, 1922 |
| 2,503,522 | Struthers et al. | Apr. 11, 1950 |